United States Patent [19]

Pavlath

[11] Patent Number: 4,752,132
[45] Date of Patent: Jun. 21, 1988

[54] LOW POWER CONTROL INTERFEROMETRIC SENSOR WITH WIDE DYNAMIC RANGE

[75] Inventor: George A. Pavlath, Thousand Oaks, Calif.

[73] Assignee: Litton Systems, Inc., Beverly Hills, Calif.

[21] Appl. No.: 923,114

[22] Filed: Oct. 24, 1986

[51] Int. Cl.⁴ .............................................. G01B 9/02
[52] U.S. Cl. .................................................. 356/345
[58] Field of Search ...................... 356/345, 359, 352; 250/227

[56] References Cited

U.S. PATENT DOCUMENTS

| | | | |
|---|---|---|---|
| 3,990,036 | 11/1976 | Savit | 340/15.5 TS |
| 4,360,272 | 11/1982 | Schmadel et al. | 356/352 |
| 4,368,981 | 1/1983 | Ozeki | 356/352 |
| 4,443,700 | 4/1984 | Macedo et al. | 250/227 |
| 4,505,587 | 3/1985 | Haus et al. | 356/345 |
| 4,552,457 | 11/1985 | Giallorenzi | 356/345 |
| 4,588,255 | 5/1986 | Tur et al. | 350/96.16 |
| 4,632,551 | 12/1986 | Pavlath | 356/345 |

FOREIGN PATENT DOCUMENTS

| | | |
|---|---|---|
| 0023345 | 2/1981 | European Pat. Off. |
| 3224775 | 1/1983 | Fed. Rep. of Germany |
| 79/00377 | 6/1979 | PCT Int'l Appl. |
| 8301303 | 4/1983 | PCT Int'l Appl. |
| 2096762 | 10/1982 | United Kingdom |

OTHER PUBLICATIONS

Nelson et al., "Passive Techniques for Fiber Optic Sensor Systems", I.F.O.C., 3/1981, pp. 27–30.
Dandridge et al., "Phase Compensation in Interferometric Fiber Optic Sensors", Optics Letters, vol. 7, No. 6, Jun. 1982, pp. 279–281.
Nelson et al., "Passive Multiplexing Systems for Fiber Optic Sensors", Applied Optics, 9/1980, pp. 2917–2920.
Kersey et al., "Demodulating Scheme Fibre Interferometric Sensors Employing Laser Frequency Switching", *Electronics, Lett.*, vol. 19, No. 3, pp. 102–103, (2/13/83).

*Primary Examiner*—Gene Wan
*Attorney, Agent, or Firm*—Lynn & Lynn

[57] ABSTRACT

A plurality of sensors are adjusted to provide coarse and fine measurements of a physical parameter such as acoustic pressure. A first interferometric sensor is adjusted to produce a $2\pi$ phase shift between its sensing and reference beams for the maximum value of the parameter to be measured. A second interferometric sensor is adjusted to produce a $2\pi$ phase shift for the minimum value of the parameter to be detected and to produce an integer multiple of $2\pi$ for the maximum value. Power is supplied to the sensors to operate them over a predetermined dynamic range. The dynamic range of the system is the product of the dynamic ranges of the two sensors. The sensor system may include several sensors arranged to have sensitivities whose ratios form a binary sequence. Detectors produce outputs that are logic high or low depending upon whether the outputs of the sensors exceed a threshold, thus forming the bits of a digital word that indicates the value of the parameter being measured.

22 Claims, 6 Drawing Sheets

LOW POWER CONTROL INTERFEROMETRIC SENSOR WITH WIDE DYNAMIC RANGE

BACKGROUND OF THE INVENTION

This invention relates generally to sensors and particularly to fiber optic sensors. In particular, this invention relates to fiber optic interferometric sensors arranged in arrays for measuring geophysical parameters. Still more particularly, this invention relates to fiber optic interferometric sensors that respond to perturbations such as acoustic wavefronts by producing a phase difference in two light beams propagated by fiber optic material.

Operational requirements for sensor arrays such as those used in geophysical applications include having a wide dynamic range for each individual sensor. Such sensors may require a dynamic range of about $10^6$ or more.

Optical fibers are sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as hydrophones, magnetometers, accelerometers and electric current sensors.

Mach-Zehnder, Michelson, Sagnac, and resonant ring interferometers have been used as sensors. Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

The Mach-Zehnder interferometer is particularly sensitive to acoustic vibrations. A fiber optic Mach-Zehnder interferometer typically has a reference arm comprising a first length of optical fiber and a sensing arm comprising a second length of optical fiber. The sensing arm is exposed to a physical parameter, such as an acoustic wavefront, to be measured while the reference arm is isolated from changes in the parameter. When the Mach-Zehnder interferometer is used as an acoustic sensor, acoustic wavefronts change the optical length of the sensing arm as a function of the acoustic wave intensity. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

A Michelson interferometer also has a sensing arm and a reference arm that propagate sensing and reference signals, respectively. However, in the Michelson interferometer these arms terminate in mirrors that cause the sensing and reference signals to traverse their respective optical paths twice before being combined to produce an interference pattern.

Arrays of acoustic sensors are used in geophysical explorations and various sonic detection applications. Previous sensor arrays commonly used in such applications include a great many active sensors, which are expensive and difficult to operate, primarily because of the large number of wires required to activate the sensors and receive data therefrom.

Large arrays formed from previous fiber optic sensors require large amounts of optical power. For example, an array of about 4000 sensors requires ten watts or more. Lasers that produce such large power outputs and that are compatible with with optical fibers are bulky, inexpensive and inefficient.

SUMMARY OF THE INVENTION

The present invention provides and optical interferometric sensor system that overcomes the disadvantages of previous sensor arrays. The interferometric sensor system of the invention has a dynamic range that exceeds $10^6$ and which operates at power levels significantly below the power levels of previous sensor arrays.

A sensor system according to the present invention comprises a first sensor having a first sensitivity to a physical parameter. The output of the first sensor is preferably cyclic with respect to changes in the physical parameter. The sensor system further includes means for applying sufficient power to the first sensor to operate it over a predetermined dynamic range of the physical parameter. The sensor system includes at a second sensor set to have a second sensitivity that is an integer multiple of the first sensitivity. The output of the second sensor is cyclic with respect to changes in the physical parameter such that a change in the parameter that produces $N_1$ cycles of the first sensor output produces $N_2$ cycles of the second sensor output, where $N_1$ and $N_2$ are integers. The sensor system also contains means for applying sufficient power to the second sensor to operate the second sensor over a predetermined dynamic range of the physical parameter.

The first and second sensors are preferably interferometric optical sensors that each include a reference optical path isolated from the physical parameter being measured and a sensing optical path exposed to the physical parameter. The signals output from each sensor are phase differences between light beams traversing a reference optical path and a corresponding sensing optical path.

The sensitivity of the first sensor is preferably adjusted to produce a phase shift of $2\pi$ radians for a predetermined maximum field strength of the physical parameter to be measured. The sensitivity of the second sensor is adjusted to provide a $2\pi$ phase shift for a minimum detectable field strength of the physical parameter and to provide a phase shift of $(2\pi)K$ for the maximum field strength to be measured. K is an integer.

The sensor system according to the invention preferably includes a first Mach-Zehnder interferometer having a first sensing arm and a first reference arm having a first sensitivity to the physical parameter being measured. The sensor system preferably includes a second Mach-Zehnder interferometer having a second sensing arm having a second sensitivity to the parameter and a second reference arm. The sensitivities of the first and second sensing arms are preferably in the ratio of $N_1:N_2$.

A sensor system according to the present invention preferably includes n sensors having sensitivities $N_1$, $N_2$, $N_3$ ... $N_n$ that are in the ratios of $1:2:4: ... 2^{n-1}$ to form a binary sequence. Detectors monitor the output of each sensor and produce logic high signal for each sensor having an output that exceeds a threshold value. The detectors produce logic low signals for each sensor having an output below the threshold value. The sensors are preferably arranged in an increasing progression of sensitivity beginning with the least sensitive and ending with the most sensitive so that they form a digital word.

The method of the present invention for forming a sensor system comprises constructing a first sensor having a first sensitivity to a physical parameter such that the output of the first sensor is cyclic with respect to changes in the physical parameter. The method further includes applying sufficient power to the first sensor to operate it over a predetermined dynamic range of the physical parameter. The method also includes constructing a second sensor having a sensitivity that is an integer multiple of the first sensitivity such that the output of the second sensor is cyclic with respect to changes in the physical parameter. A change in the parameter that produces $N_1$ cycles of the first sensor output produces $N_2$ cycles of the second sensor output, where $N_1$ and $N_2$ are integers.

The method of the invention may further include the steps of forming the first and second sensors as interferometric optical sensors such that each includes a reference optical path isolated from the physical parameter being measured and a sensing optical path exposed to the physical parameter so that the signals output from each sensor are phase differences between light beams traversing the reference optical path and the sensing optical path. The sensor method also preferably includes adjusting the sensitivity of the first sensor is to produce a phase shift of $2\pi$ radians for a predetermined maximum field of strength of the physical parameter and adjusting the sensitivity of the second sensor to provide a $2\pi$ phase shift for a minimum detectable field strength of the physical parameter and to provide a phase shift of $(2\pi)K$. for the maximum field strength to be detected. K is an integer.

The method of the invention may further include providing a plurality of sensors having sensitivities $N_1$, $N_2$, $N_3$ ... $N_n$ in the ratios of $1:2:4: ... 2^{n-1}$ to form a binary sequence and monitoring the output of each sensor with a detector means that produces a logic high signal for each sensor having an output exceeding a threshold value and a logic low signal for each sensor having an output below the threshold value. The method may further include the steps of forming each of the plurality of sensors to comprise a Mach-Zehnder interferometer having a sensing arm and a reference arm with the reference arms of the Mach-Zehnder interferometers being adjusted to form sensitivities in the ratio of the the binary sequence. The method may further include the step of arranging the sensors in an increasing progression of sensitivity beginning with the least sensitive and ending with the most sensitive to form a digital word.

DESCRIPTION OF THE PREFERRED EMBODIMENT

Figure 1:
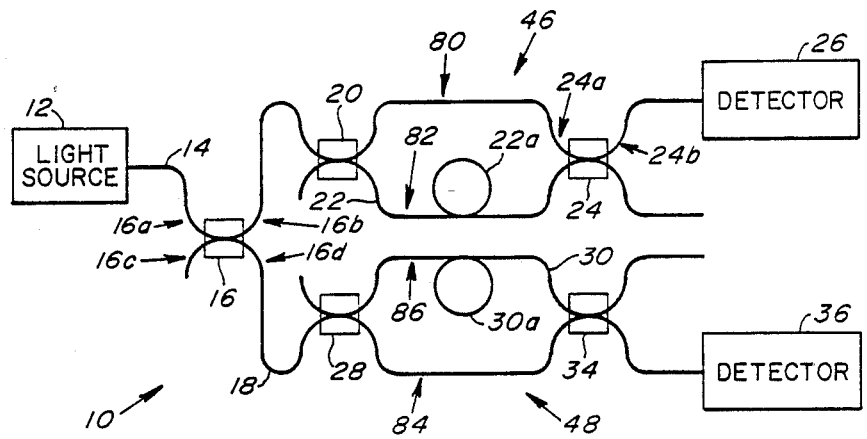
FIG. 1 illustrates an interferometric sensor system according to the invention comprising two Mach-Zehnder interferometers.

Referring to FIG. 1, an interferometric sensor system 10 includes a light source 12, which is any suitable coherent light source for introducing light into an optical fiber 14. After being introduced into optical fiber 14 and the light passes through an optical coupler 16 that couples light between optical fiber 14 and an optical fiber 18.

Light that remains in optical fiber 14 propagates to an optical coupler 20 that couples light between optical fiber 14 and an optical fiber 22. The circle in optical fiber 22 represents a coil 22A comprising $N_1$ turns. Light still remaining in optical fiber 14 after it passes through the coupler 20 and the light coupled into fiber 22 and propagates to an optical coupler 24. Optical coupler 24 couples a portion of the light that optical coupler 20 coupled into optical fiber 22 back into optical fiber 14. The combined waves then impinge upon a detector 26. Therefore, the light incident upon the detector 26 is the superposition of two light waves.

Light that optical coupler 16 couples from optical fiber 14 into optical fiber 18 propagates to an optical coupler 28 that couples light between optical fiber 18 and an optical fiber 30. The circle in optical fiber 30 represents a coil 30A comprising $N_2$ turns of the fiber preferably of the same diameter as the coil 22A. Light still remaining in optical fiber 18 propagates to an optical coupler 34 and then to a detector 36. Optical coupler 34 couples a portion of the light that optical coupler 28 coupled into optical fiber 30 back into optical fiber 18. Therefore, the light incident upon the detector 36 is also the superposition of two light waves.

Optical couplers 20 and 24 and optical fibers 14 and 22 comprise a Mach-Zehnder interferometer 46. Similarly, optical couplers 28 and 34 and optical fibers 18 and 30 comprise a Mach-Zehnder interferometer 48.

The fiber optic components of the interferometric sensor system 20 will be described in detail before describing the method of operation the invention as a wide dynamic range sensor.

Optical Couplers

A. Evanescent Field Couplers

All of the optical couplers such as the couplers 16, 20, 24 28 and 34 may be of substantially identical structure. Therefore, the following description of the optical coupler 16 is applicable to all optical couplers included in the interferometric sensor system 10 when the optical fibers 14 and 18, 22 and 30 are single mode fibers.

For multimode fiber implementations of the interferometric sensor system 20, suitable multimode couplers (not shown) are well-known in the art. However, a type of multimode coupler that may be particularly suitable for forming the sensor system 10 is described in U.S. patent application Ser. No. 816,982 by John J. Fling, assignor to Litton Systems, Inc., assignee of the present invention. This coupler is briefly described subsequently.

A fiber optic directional coupler suitable for use in single mode applications as the coupler 16 of FIG. 1 is described in the Mar. 29, 1980 issue of *Electronics Letters*, Vol. 16, No. 16. pp. 260-261 and in U.S. Pat. No. 4,493,528, issued Jan. 15, 1985 to Shaw et al.

Figure 4:
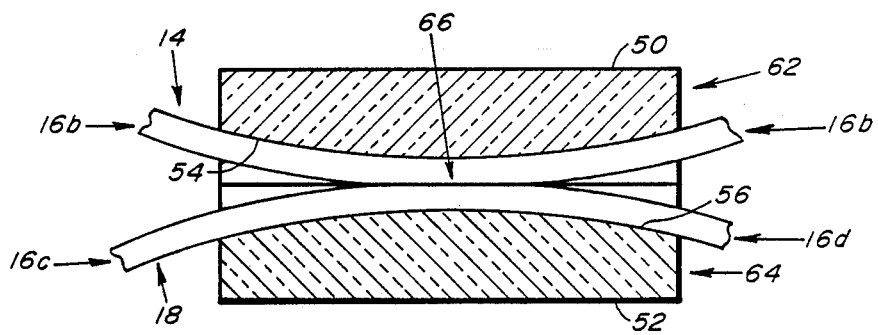
FIG. 4 is a cross sectional view of a fiber optic directional coupler that may be included in the sensor systems of FIGS. 1-2.
Figure 5:
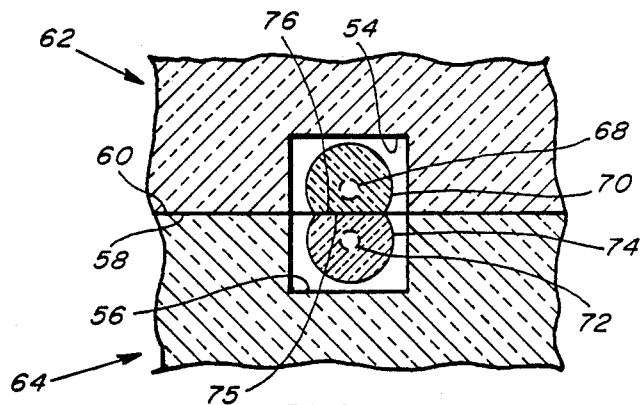
FIG. 5 is a cross sectional view about line 5—5 of FIG. 4.
Figure 6:
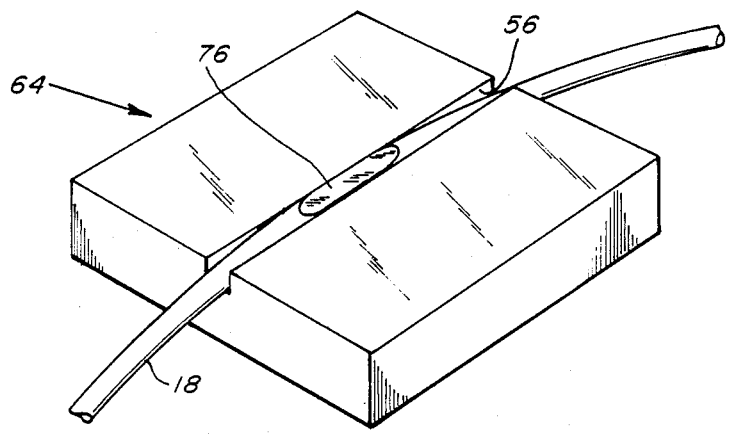
FIG. 6 is a plan view of a coupler half that is preferably included in the fiber optic directional coupler of FIG. 4.

As illustrated in FIGS. 4-6, the coupler 16 includes the optical fibers 14 and 18 of FIG. 1 mounted in a pair of substrates 50 and 52, respectively. The fiber 14 is mounted in a curved groove 54 formed in an optically flat surface 58 of the substrate 50. Similarly, the fiber 18 is mounted in a curved groove 56 formed in an optically flat surface 60 of the substrate 52. The substrate 50 and fiber 14 mounted therein comprise a coupler half 62, and the substrate 52 and fiber 18 mounted therein comprise a coupler half 64.

The curved grooves 54 and 56 each have a radius of curvature that is large compared to the diameters of the fibers 14 and 18, which are ordinarily substantially identical. The widths of the grooves 54 and 56 are slightly larger than the fiber diameters to permit the fibers 14 and 18 to conform to the paths defined by the bottom walls of the grooves 54 and 56, respectively. The depths of the grooves 54 and 56 vary from a minimum at the center of the substrates 50 and 52, respectively, to a maximum at the edges of the substrates 50 and 52. The variation in groove depth permits the optical fibers 14 and 18, when mounted in the grooves 54 and 56, respectively, to gradually converge toward the centers and diverge toward the edges of the substrates, 50 and 52, respectively. The gradual curvature of the fibers 14 and 18 prevents them from having sharp bends or other abrupt changes in direction, which prevents power loss through mode perturbation. The grooves 54 and 56 may be rectangular in cross section; however, it is to be understood that other cross sectional configurations such as U-shaped or V-shaped may be used in forming the coupler 16.

Light is transferred between the fibers 14 and 18 by evanescent field coupling at an interaction region 66. The optical fiber, 14 comprises a central core 68 and a surrounding cladding 70. The fiber 18 has a core 72 and a cladding 74 that are substantially identical to the core 68 and cladding 70, respectively. The core 68 has a refractive index that is greater than that of the cladding 70, and the diameter of the core 68 is such that light propagating within the core 68 internally reflects at the core-cladding interface. Most of the optical energy guided by the optical fiber 14 is confined to its core 68. However, solution of the wave equations for the fiber 68 and applying the well-known boundary conditions shows that the energy distribution, although primarily in the core 68, includes a portion that extends into the cladding and decays exponentially as the radius from the center of the fiber increases. The exponentially decaying portion of the energy distribution within the fiber 68 is generally called the evanescent field. If the evanescent field of the wave initially guided by the fiber 14 extends a sufficient distance into the fiber 18, energy will couple from the fiber 14 into the fiber 18.

Referring to FIGS. 4-6, at the centers of the substrates 50 and 52, the depths of the grooves 54 and 56 are less than the diameters of the fibers 14 and 18. At the edges of the substrates 50 and 52, the depths of the grooves 54 and 56 are preferably at least as great as the fiber diameters. Fiber optic material is removed from each of the fibers 14 and 18 by any suitable method, such as lapping, to form oval-shaped planar surfaces 75 and 76, respectively. The surfaces 75 and 76 are coplanar with the confronting surfaces 58 and 60 of the substrates 50 and 52. The oval surfaces 75 and 76 are juxtaposed in facing relationship at the interaction region 66, best shown in FIG. 6, where the evanescent field of light guided by each of the fibers 14 and 18 interacts with the other fiber. The amount of fiber optic material removed increases gradually from zero near the edges of the substrates 50 and 52 to a maximum amount at the centers of the substrates 50 and 52. As best shown in FIG. 4, the tapered removal of the fiber optic material enables the fibers 14 and 18 to converge and diverge gradually, which is advantageous for avoiding backward reflection and excessive loss of light energy at the interaction region 66.

It has been found that to ensure proper evanescent field coupling, the amount of material removed from the fibers 14 and 18 must be carefully controlled so that the spacing between the cores of the fibers 14 and 18 is within a predetermined critical zone. The evanescent field extends a short distance into the cladding and decreases rapidly in magnitude with distance outside the fiber core. Thus, sufficient fiber optic material should be removed to permit overlap between the evanescent fields of waves propagated by the two fibers 14 and 18. If too little material is removed, the cores will not be sufficiently close to permit the evanescent fields to cause the desired interaction of the guided waves; and therefore, insufficient coupling will result.

Conversely, removal of too much material alters the propagation characteristics of the fibers, resulting in loss of light energy from the fibers due to mode perturbation. However, when the spacing between the cores of the fibers 14 and 18 is within the critical zone, each fiber 14 and 18 receives a significant portion of the evanescent field energy from the other to achieve good coupling without significant energy loss. The critical zone includes the region in which the evanescent fields of the fibers 14 and 18 overlap sufficiently to provide good evanescent field coupling with each core being within the evanescent field of light guided by the other core. It is believed that for weakly guided modes, such as the $HE_{11}$ mode guided by the single mode fibers, mode perturbation occurs when the fiber core is exposed. Therefore, the critical zone is the core spacing that causes the evanescent fields to overlap sufficiently to cause coupling without causing substantial mode perturbation induced power loss.

The extent of the critical zone for a particular coupler depends upon a number of factors, such as the parameters of the fibers and the geometry of the coupler. The critical zone may be quite narrow for a single mode fiber having a step index profile. The center-to-center spacing of the fibers 14 and 18 is typically less that 2 to three core diameters.

The substrates 50 and 52 may be fabricated of any suitably rigid material. In a preferred embodiment, the substrates 50 and 52 comprise generally rectangular blocks of fused quartz glass approximately 2.5 cm long, 2.5 cm wide and 1.0 cm thick. The fibers 14 and 18 may be secured in the curved grooves 54 and 56 by a suitable cement (not shown) such as epoxy resin. The fused quartz substrates 50 and 52 advantageously have a coefficient of thermal expansion similar to that of the fibers 14 and 18, which is important in maintaining predetermined coupling characteristics if the substrates 50 and 52 and the fibers 14 and 18 are subjected to any heat treatment during manufacture or use. For some applications the coupler 16 may comprise only the two fibers 14 and 18 with the two oval regions being fused or bonded together without being retained in the substrates 50 and 52.

The coupler 16 of FIGS. 1 and 4 includes four ports labeled 16A, 16B, 16C and 16D. Ports 16A and 16B, which are on the left and right sides, respectively, of the coupler 16 correspond to the fiber 14. The ports 16C and 16D, which are on the left and right sides, respectively, of the coupler 16 correspond to the fiber 18. For purposes of explanation it is assumed that an optical signal input is applied to port 16A through the fiber 14. The signal passes through the coupler 16 and is output at either one or both of ports 16B or 16D depending upon the amount of coupling between the fibers 14 and 18. The "coupling constant" is defined as the ratio of the coupled power to the total output power. In the above example, the coupling constant is the ratio of the power output at port 16D divided by the sum of the power output at the ports 16B and 16D. This ratio is sometimes called the "coupling efficiency" which is typically expressed as a percent. Therefore, when the term "coupling constant" is used herein, it should be understood that the corresponding coupling efficiency is equal to the coupling constant times 100.

The coupler 16 is highly directional, with substantially all of the power applied at one side thereof being output at the ports on the other side. Substantially all of the light applied as an input to either ports 16A or 16C is delivered to ports 16B and 16D without appreciable contra-directional coupling. The directional characteristic is symmetrical in that some light applied to either ports 16B or 16D is delivered to ports 16A and 16C. The coupler 16 is essentially non-discriminatory with respect to polarizations and preserves the polarization of light input thereto.

Light that is cross-coupled from one of the fibers 14 and 18 to the other undergoes a phase shift of $\pi/2$, but light passes straight through the coupler 16 without being cross-coupled is not shifted in phase. For example, if the coupler 16 has a coupling constant of 0.5, and an optical signal is input to port 16A, then the outputs at ports 16B and 16D will be of equal magnitude; but the output at port 16D will be shifted in phase by $\pi/2$ relative to the output at port 16B.

The coupler 16 is a low loss device, having typical insertion losses of about 0.1% to 0.2%. The term "insertion loss" as used herein refers to the real scattering losses of light energy passing through the coupler 16. For example, if light energy is input to port 16A; and the light energy output at ports 16B and 16D totals 97% of the input energy, the insertion loss is 3%. The term "coupler transmission" is defined as one minus the insertion loss and is typically expressed an a decimal fraction.

B. The Substrates

Figure 7:
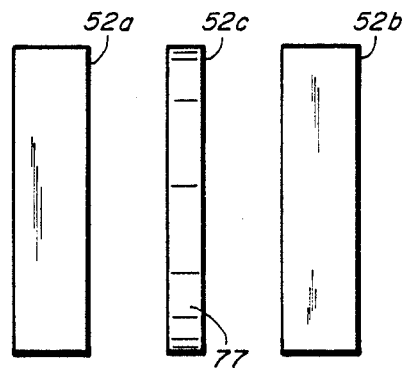
FIG. 7 is an exploded plan view of a substrate that may be included in the coupler of FIG. 4.
Figure 8:
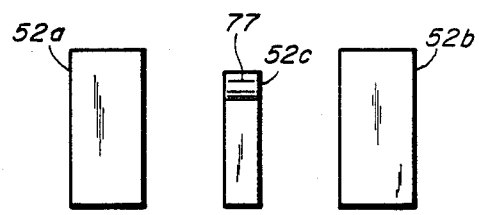
FIG. 8 is an exploded perspective view of the substrate of FIG. 7.
Figure 9:
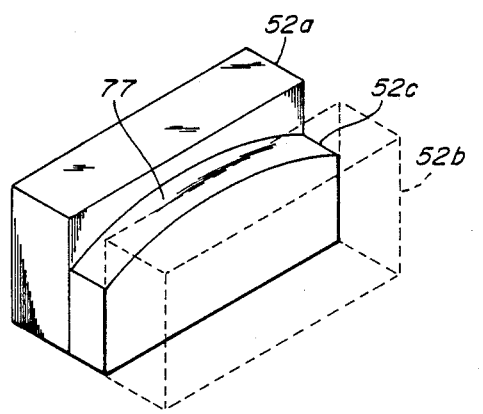
FIG. 9 is an exploded view of the substrate of FIGS. 7 and 8.

Referring to FIGS. 7-9, the substrate 52 may be formed from a pair of side laminates 52A and 52B and a center laminate 52C The side laminates 52A and 52B are preferably formed as rectangular parallelepipeds. The center laminate 52C may be formed from a rectangular parallelepiped; however, an edge 77 of the center laminate 52B is machined to form a convex curve. The center laminate 52B preferably has a length of about 0.400 inches and a width of about 0.05 inches. The maximum height of the center laminate 52C is preferably about 0.045 inches. The side laminates 52A and 52B are substantially identical to one another. For example, the side laminate 52A is preferably about 0.400 inches long, about 0.040 inches thick and slightly higher than the 0.045 inch height of the center laminate. It has been found that a height of 0.050 inch is satisfactory for the side laminates 52A and 52B.

The coupler 16 is formed by placing the center laminate 52A between the two side laminates 52A and 52B. The laminates 52A, 52B and 52C are lined up lengthwise so that the two larger flat surfaces of the center laminate 52B are held between two of the larger rectangular surfaces of the side laminates 52A and 52B. The side laminate 52B is placed on the center laminate 52C to be symmetrical with the side laminate 52A. Since the height of the side laminates 52A and 52B is about 0.005 inches greater than the 0.045 inch height of the center laminate 52C the convex groove 56 is formed between the side laminates 52A and 52B.

The three laminates 52A, 52B and 52C are positioned together to form the groove 56 and are then clamped tightly together by any conventional clamping means. After the fiber 18 is placed in the groove 56 tension is applied to the fiber so that it conforms to the curvature of the groove. The laminates 52A, 52B, 52C and fiber 18 are then bonded together. The laminates 52A and 52B are then lapped until a desired amount of the fiber 18 has been removed to form the oval surface 76.

C. Bonding Coupler Halves Together.

Optical couplers are formed by bonding two coupler halves together with the planar portions of the fibers facing one another. The fibers may be bonded by application of a suitable adhesive to the substrates while they are clamped together.

A laser fusion method for bonding the fibers 16 and 22 together may produce higher quality couplers for some applications than adhesive bonding. After the fibers 14 and 18 are mounted on the corresponding substrates 50 and 52, and the oval surfaces are formed using conventional lapping techniques, the planar surfaces 75 and 76 are placed in juxtaposition as shown in FIGS. 4 and 5.

The coupler 10 may be formed to have a desired coupling constant. One preferred method for assuring achievement of a desired coupling constant includes the step of inputting an optical signal from a laser (not shown) into an end of the fiber 14. The intensities of the optical signals emanating from the fibers 14 and 18 after the input beam has impinged upon the interaction region 66 are monitored using suitable photodetectors (not shown) while the substrates 50 and 52 are manipulated to achieve a desired coupling efficiency. The coupling efficiency is $$\eta = I_c(I_t + I_c)^{-1}, \qquad (1)$$

wherein $\eta$ is the coupling efficiency, $I_t$ is the light transmitted through fiber 14 beyond the interaction region 66 and $I_c$ is the light intensity coupled from fiber 14 to fiber 18.

After the fibers 14 and 18 have been positioned to provide the desired coupling constant, energy is applied to the interface of the planar surfaces 75 and 76. The energy source may be a CO₂ laser (not shown). The laser beam should heat the fibers 14 and 18 to a temperature near the glass transition temperature. The energy source may also be an ultrasonic wave generator, an induction heating source or other suitable device for providing the desired amount of heat to the fibers 16 and 22.

The transition temperature is below the melting point of the glass from which the fibers 14 and 18 are formed. The transition temperature depends upon the materials comprising the fibers 14 and 18. Most optical fiber is formed from silicon dioxide with a dopant such as germanium dioxide or boron added thereto to control the refractive index. Such fibers typically have transition temperatures in the range of 1100° C. to 1200° C. The transition temperature should be determined experimentally for the fibers to be joined, and the energy output from the laser should be controlled to assure that the temperature in the bonded region does not exceed the transition temperature. The transition temperature of an optical fiber is attained when the fiber begins to soften as the temperature increases.

Applying the output of the laser over the juncture of the surfaces 75 and 76 fuses the fibers 14 and 18 together. The laser fusion process of joining optically flat surfaces on fibers 14 and 18 provides a fiber optic coupler having a bonded surface that is homogeneous and continuous across and around the joined surfaces 75 and 76 of the fibers 14 and 18. Accordingly, local irregularities in the refractive indices are avoided, with the resultant interaction region 66 of the joined region having well behaved refractive indices throughout as expected for a molecularly consistent material.

D. Multimode Coupler

The primary difference between the steps for fabricating the evanescent field coupler 10 and an intercepting core multimode coupler (not shown) is the depth to which the fibers 14 and 18 are lapped. The amount of coupling depends upon the length of the interaction zone, which is a function of the lapping depth and the radius of curvature of the fiber being lapped. It has been found that in general a 3 dB intercepting core coupler should have the fibers lapped to remove 50% of the core to provide full modal mixing. It is well known from electromagnetic theory that the energy distributions of the normal modes varies with the radial distance from the center of an optical fiber. The energy in the lower order modes tends to be primarily in the central region of the core, whereas the higher order modes tend to have more energy near the core/cladding interface. Since most of the energy in a multimode fiber is in the lower order modes, good coupling is facilitated by having the central regions of the cores on contact.

Mach-Zehnder Interferometer

The Mach-Zehnder interferometer 46 includes the pair of couplers 20 and 24 that couple light between the fiber 14 and the fiber 22. The lengths of the fiber 14 and the fiber 22 between the couplers 16 and 24 comprise a reference arm 80 and a sensing arm 82, respectively. In general, the reference arm 80 and the sensing arm 82 have different lengths. Light propagating in the reference arm 80 is called the reference signal, and light propagating in the sensing arm 82 is called the sensing signal. The coupler 24 couples a portion of the sensing signal back into the fiber 14 for output at port 24B while also transmitting a portion of the reference signal into fiber 14 to form the output of the Mach-Zehnder interferometer 46. A portion of the reference signal continues to be guided by the fiber 14 and propagates from port 24A to port 24B. The coupler 24 combines portions of the reference and sensing signals and produces an output signal at port 24B that is a superposition of portions of the reference and sensing signals. The result of combining the reference and sensing signals is the formation of an interference pattern between the reference and sensing signals at port 24B. This interference pattern is a function of the phase difference $\theta$ between the reference and sensing signals and is the output of the Mach-Zehnder interferometer 46 that is supplied to the detector 26.

The sensing arm 82 and the reference arm 80 may have quiescent lengths such that the sensing signal and the reference signal combine in phase in the coupler 24. The physical parameter, such as acoustic vibrations, to be measured is coupled to the sensor arm 82 by any convenient means. The specific type of coupling between the parameter and the sensing fiber 80 depends upon the parameter. Changes in the parameter while the reference arm 80 is isolated from changes in the parameter produce an optical path length change $\Delta L$ in the sensor arm 82, which causes a phase shift between the reference signal and the sensing signal.

The reference signal undergoes a phase shift $\theta_R(t)$ while propagating from the the coupler 16 to the coupler 24. While propagating from the coupler 16 to the coupler 24, the sensing signal experiences a phase shift of $\theta_S(t)$, which is a function of the phase shift caused by the fiber 18 and fluctuations in the sensed physical parameter. The phase difference $\Delta\theta = \theta_S - \theta_R$ is the signal output from the Mach-Zehnder interferometer 46. The Mach-Zehnder interferometer 46 may be calibrated so that changes in the sensed parameter may be quantitatively related to the amount of phase shift in the interference pattern.

Other types of interferometric sensors, such as a Michelson intereferometer described subsequently, may be included in the interferometric sensor system 10. However, the exemplary embodiment of the invention shown in FIG. 1 is described with reference to the Mach-Zehnder interferometer 46.

Michelson Interferometer

Figure 10:
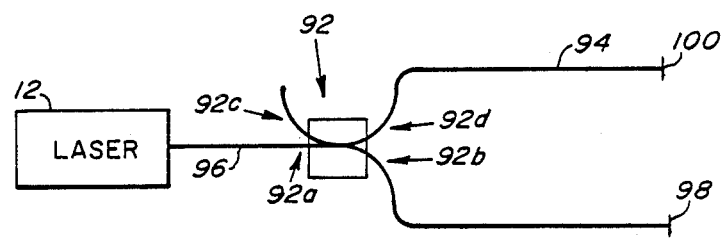
FIG. 10 is a schematic drawing of a fiber optic Michelson interferometer.

Referring to FIG. 10, a Michelson interferometer 90 suitable for use in the system 10 comprises a fiber optic directional coupler 92, a sensing fiber 94 and a reference fiber 96. The sensing fiber 94 and the reference fiber 96 terminate in mirrors 98 and 100, respectively. Light from the laser 12 is input to one of the fibers, for example, the reference fiber 96, which guides the light to port 92A of the coupler 92. The coupler 92 couples part of the input light for output at port 92D into the sensing fiber 94, which is exposed to the physical parameter being monitored. The mirror 98 reflects the sensing signal back through the sensing fiber 94 to port 92D. Light that is not cross coupled into the sensing fiber 94 is output at port 92B and remains in the reference fiber 96 as a reference signal. The mirror 100 reflects the reference signal back to port 92B.

The coupler 92 combines the sensing and reference signals by coupling a portion of the reference signal into the sensing fiber 94. Combining the sensing and reference signals produces an interference pattern. The combined sensing and reference signals are output at port 92C and impinge upon the detector 54 for subsequent processing to determine the phase change in the sensing signal caused by exposure to the physical parameter.

Method of Operation

The lengths of the sensing arms 82 and 86 Mach-Zehnder interferometers 46 and 48, respectively, are the primary consideration in determining the sensitivity of the sensor 10. Other factors that affect the sensitivity are the type of material the coils are wound upon and the type of jacketing material on the fibers. The length is of paramount importance because it determines the size of the interaction region between the sensing fiber and the acoustic wavefront.

In a preferred embodiment for use in sensing acoustic wavefronts, the turns ratio is 1000:1 in the sensing arms so that $N_2/N_1 = 1000$. Interferometer 48 is thus 1000 times more sensitive to external fields than interferometer 46.

Each interferometer is shot noise limited. Shot noise is the uncertainty in the number of electrons generated in the photodetector when the light wave hits it. The electronics in the photodetectors 26 and 36 can measure the phase differences between the reference and signal arms modulo $2\pi$ with a precision determined by the shot noise. The phase difference is modulo $2\pi$ in the Mach-Zehnder interferometers 46 and 48 because they produce an output that is indicative of the phase difference between the sensing and reference signals. The phase difference is a multivalued function that repeats itself every $2\pi$ radians of phase difference.

In the shot noise limit the minimum detectable signal is proportional to the square root of the optical power, $P_{OPT}$. The minimum detectable signal may be written as $$P_{MIN} \alpha (P_{OPT})^{\frac{1}{2}}. \tag{2}$$

The maximum signal is proportinal to the optical power. The maximum signal may be written as $$P_{MAX} \alpha P_{OPT}. \tag{3}$$

The dynamic range, DR, is the ratio of the maximum signal to the minimum signal and may be written as $$DR = P_{MAX}/P_{MIN}. \tag{4}$$

Substituting the proportionalities from expressions (1) and (2) gives $$DR = P_{OPT}(P_{OPT})^{-\frac{1}{2}}, \tag{5}$$

which reduces to $$DR = (P_{OPT})^{\frac{1}{2}}. \tag{6}$$

For example, assume that a dynamic range of $10^6$, which corresponds to 60 dB, is required for a particular application of the sensor 10. If only one interferometer is used to cover the entire signal range then the optical power required for the 60 db range is $$P_{OPT} = (DR)^2 = (10^6)^2 = 10^{12} \text{ (arbitrary units)}. \tag{7}$$

The sensor 10 of FIG. 1 is capable of achieving a 60 db dynamic range with a significantly lower optical power input than is possible with a single interferometer. This wide dynamic range is achieved by setting the interferometer 46 to have a dynamic range of $10^3$. The sensitivity of inteferometer 48 is 1000 times greater than the sensitivity of interferometer 46 because of the 1000:1 turns ratio. Therefore, interferometer 48 is capable of detecting signals having intensities that are 0.001 of the minimum intensity which interferometer 46 is capable of detecting. If the power input to interferometer 46 is sufficient for a $10^3$ dynamic range, then the minimum detectable signal of interferometer 48 is $10^{-6}$ of the maximum field intensity as measured by interferometer 46.

The sensitivities of interferometers 46 and 48 are determined by carefully adjusting the sensing arms 82 and 86. The sensing arm 86 arm is adjusted so that light guided by it has a $2\pi$ phase shift relative to light guided by reference arm 80 over a dynamic range of $10^3$. The $2\pi$ phase shift is determined by the length and jacketing of the fibers and the material of a mandrel (not shown) upon which the coil is wound. The material of the mandrel and jacketing can be used to make coarse adjustments of the phase shift. Fine adjustments are preferably accomplished by adjusting the length of the sensing fiber 30 to the length needed to get desired sensitivity.

The adjustments may be done during fabrication of the sensor system 10 by setting up interferometer in a laboratory environment where different fibers and mandrel materials may be put in the sensing arms for exposure to the physical field to be measured. A preferred procedure is to start with a longer length that will finally be required and shorten the fiber during the adjustment procedure. Lenses and beam splitters (not shown), rather than optical couplers, are preferably used in the adjustment procedure to get desired length of the sensing arm. The system 10 is then assembled with optical couplers at ends of the sensing and reference arms. The adjustment procedure allows adjustment of length as needed before the sensing system 10 permanently assembled. The adjustment procedure also facilitates the fabrication of many identical sensor systems.

Therefore both interferometer 46 and 48 have a phase shift of $2\pi$ at their respective minimum detectable signals. The phase shift for each interferometer increases by $2\pi$ for every signal increase that is an integer multiple of its minimun detectable level.

In seismic applications the maximum acoustic field to be measured is about 0.1 bar. One bar is about an atmosphere. The coil length of interferometer 48 is set to make it 1000 times more sensitive than interferometer 46 by adjusting the same parameters described above. If the phase shift in interferometer 46 is $2\pi$ at the maximum field, then the second interferometer 48, being 1000 times more sensitive will have a phase shift of $2000\pi$ for the same signal. At the minimum signal detectable by the second interferometer 48, it will have a $2\pi$ shift. The minimum signal detectable by interferometer 48 is undetectable by interferometer 46 so that it will have no phase shift at this minimum signal. The principle that allows the wide dynamic range of the sensor system 10 is that sensitivities of the two interferometers 46 and 48 are related to one another by an integer ratio. The interferometers 46 and 48 are matched so that if a field to be measured produces N cycles of $2\pi$ in interferometer 48, then the field produces 1 cycle of $2\pi$ in the interferometer 46. Another way to view the system is to consider that one cycle of interferometer 46 is divided by N cycles of the interferometer 48.

The sensitivity of the sensor system 10 is 1000 times greater than the sensitivity obtained with a single interferometer because of the turns ratios of the interferometers 46 and 48. At the minimum detectable signal of the least sensitive interferometer, the most sensitive interferometer has a phase shift of $2\pi$. If the power input to the least sensitive interferometer is sufficient for a $10^3$ dynamic range, then the minimum detectable signal of the most sensitive interferometer is $10^{-6}$ of the maximum field to be detected. The least sensitive interferometer 46 resolves which $2\pi$ sector the phase shift of interferometer 48 is in. Hence the combination of the interferometers 46 and 48 may be regarded as being analogous to a coarse-vernier measurement system. The power required for a $10^3$ dynamic range from interferometer 46 is $$P_{OPT}(\text{DR}=30\text{ db}) \alpha (10^3)(10^3) = 10^6 \text{(arbitrary units)} \quad (8)$$

The ratio of the input power required for the sensor 10 to the power required for one sensor is $(2\times 10^6)/(10^{12}) = 2\times 10^6$. The factor of two arises from the inclusion of two interferometers in the sensor system 10. Thus the sensor system 10 covers the 60 db dynamic range of the variable being measured with 57 db less optical power than is possible with a single sensor.

The sensor system 10 has a high signal to noise ratio, which is the ratio of optical power to shot noise. The main advantage of the sensor system 10 is reduction of power requirements for achieving the desired dynamic range. The cost and complexity of prior art sensing systems vary exponentially with the power that must be input to achieve the desired dynamic range. Since the sensing system requires much less power than prior systems, it is much simpler and economical.

Digital Output Interferometric Sensor System

Figure 2:
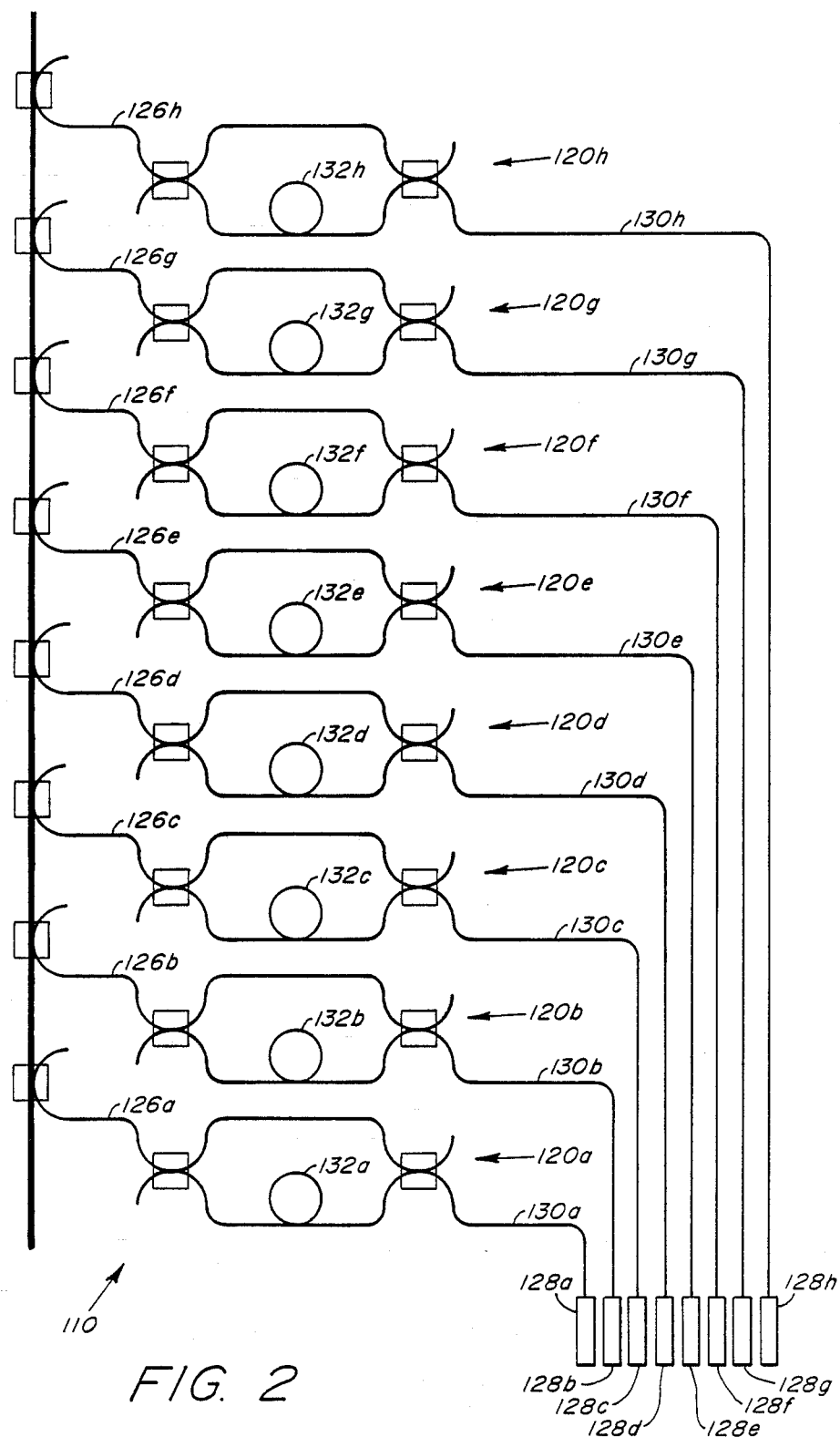
FIG. 2 illustrates an interferometric sensor system according to the invention comprising a plurality of Mach-Zehnder interferometers.

Referring to FIG. 2, a sensor system 110 according to the present invention includes an array of n interferometers 120A, 120B, etc. The interferometers are adjusted so that the sensitivity of the first interferometer 120A in the array is one unit; the sensitivity of the second interferometer 120B is 2 units; the sensitivity of the third interferometer 120C is 4 units; the sensitivity of the fourth interferometer 120D is 8 units; etc., in binary sequence. The outputs are arranged to form a digital word. The number of bits in the word equals the number of interferometers in the array. Having the sensitivities of the interferometers adjusted to form a binary sequence causes the presence or absence of fringes in the outputs of the interferometers to indicate whether each bit is a one or a zero.

The sensor array of FIG. 2 has a single transmit fiber 124 providing optical signals to each of eight optical fibers 126A, 126B, etc that correspond to the interferometers 120A, 120B, etc. Each of the interferometers 126A, 126B, etc. has its own return fiber 128A, 128B, etc. Each return fiber 128A, 128B, etc. provides an optical signal to a corresponding detector 130A, 130B, etc.

The interferometers 120A, 120B, etc. of FIG. 2 may conveniently be Mach-Zehnder interferometers although the Michelson interferometer may be used. The first interferometer 120A has a fiber sensing coil 132A having one turn. The second interferometer 120B has a fiber sensing coil 132B having two turns. The third has four turns, etc., so that the turns ratios form a binary sequence. If there are n interferometer in the array, the sensing coil of the last interferometer has $2^{n-1}$ turns. If the array has n interferometers, then there are a total of n return fibers 128A, 128B, etc. that provide signals to the detectors 128A, 128B, etc.

Figure 3:
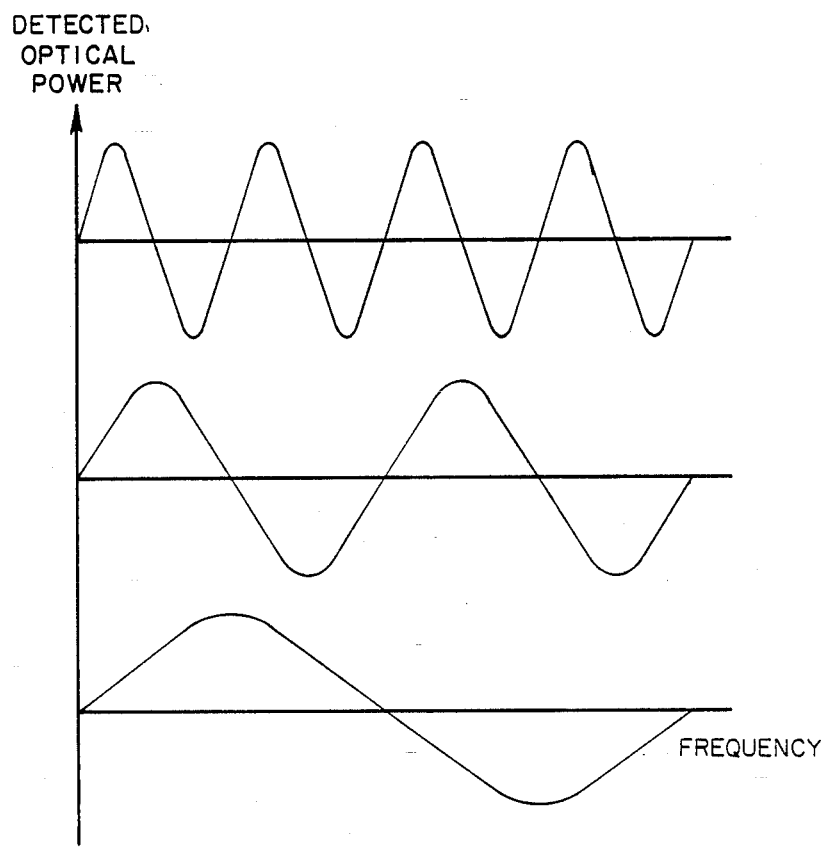
FIG. 3 graphically illustrates the signals output from the individual Mach-Zehnder interferometers in the array of FIG. 2.

FIG. 3 is a graph of the phase shift versus acoustic pressure for the first three interferometers. The interferometer outputs are sine waves having different frequencies for the different interferometers. Referring to FIG. 3, the frequency of the first interferometer 120A is taken as the basic unit frequency unit. The frequency of the second interferometer 120B is twice that of the first interferometer, and the frequency of the third interferometer 120C is twice the frequency of the second interferometer 120B. In general, the frequency doubles with each successive interferometer. This relation between the frequencies arises from the relation between the sensitivities of the interferometers.

During fabrication of the sensor system 110, a certain threshold pressure is applied to each interferometer, and the threshold of the corresponding photodetector is set at $\frac{1}{2}$ the peak of each raised sine wave output from the interferometer. For any arbitrary pressure applied to the sensing coils, those interferometers whose sensitivities are above the threshold produce a 0, or logic low in the output word, and those whose sensitivities are below the threshold produce a 1, or logic high.

The digital output is conveniently read from the least sensitive interferometer to the most sensitive. The pressure required to cross the threshold determines the sensitivity on the most sensitive interferometer. This sensitivity is the resolution of the sensor system. The maximum signal to be measured is the pressure that corresponds to a peak on the sine wave output of the to peak of first, or least sensitive interferometer 120A. The resolution corresponds to half an interference fringe on the most sensitive interferometer. The total pressure measured is $$P = P_1(B_1) + P_2(B_2) + \ldots \quad (9)$$

In geophysical applications there is a predetermined relation between $P_1$, $P_2$, etc. Geophysicists generally want the digital word to have 20 bits, which corresponds to a dynamic range of $10^6$. A dynamic range of $10^3$ may be obtained by varying the lengths of the sensing coils from 1 meter to 100 meters. The remainder of the dynamic range is provided by the mandrel material and fine tuning. The basic premise is that if 100 meters of a fiber have a certain sensitivity, then 100 meters of the fiber wound on mandrel of appropriate material will provide about 100 times the sensitivity of the fiber alone. Fine tuning is preferably accomplished by unwinding or winding the fiber turn by turn to get the desired sensitivity.

If the system cannot provide 20 bits with separate interferometers, the most sensitive interferometer output signal can be divided up into finer portions. It is possible to detect when the signal is just on the fringe. The other sensors give the modulus of the measurement, and the most sensitive interferometer gives the fine part of it.

The sensor systems described herein may be implemented with all digital devices; a hybrid system having a number of digital bits and then an analog fine scale; or an all analog system having coarse and fine readings.

Figure 11:
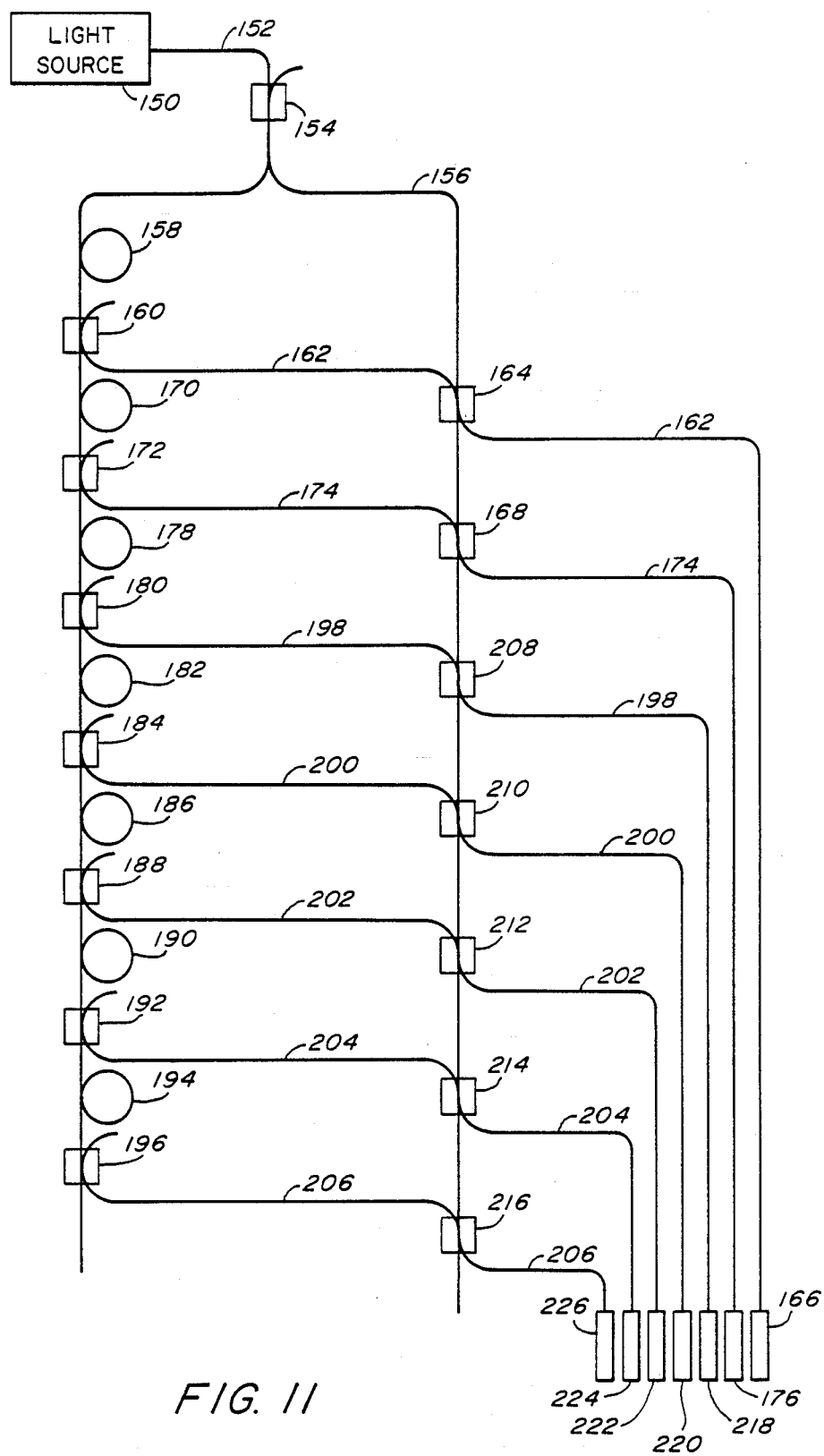
FIG. 11 schematically illustrates a second embodiment of the invention.

FIG. 11 shows a second embodiment of a digital output interferometric sensor system. The sensor system 148 of FIG. 11 includes a light source 150 that supplies light to a transmit optical fiber 152. Light input to the transmit fiber 152 propagates to an optical coupler 154 where a portion of the light is cross coupled into an optical fiber 156. The optical coupler 154 is preferably an evanescent field coupler as described previously.

Light remaining in the fiber 152 is guided through a sensing coil 158, which is exposed to a physical field to be measured. The field may be an acoustic field, for example. After propagating through the sensing coil 158, the light in fiber 152 is incident upon an optical coupler 160, which is preferably similar to the coupler 154. The coupler 160 transmits a portion of the light incident thereon and couples the remainder of the incident light into an optical fiber 162. The fiber 162 guides the coupled light to an optical coupler 164. The optical fiber 156 also guides light coupled into it by the coupler 154 to the coupler 164. The optical fiber 156 is not exposed to the field to be measured so that light guided in the fiber 156 acts as a reference beam.

The light beams from the two different paths combine in the coupler 164 and produce an interference pattern. The field being measured changes the optical path length difference between the two light paths from the coupler 154 to the coupler 164. The changes in optical path length change the interference pattern.

A detector 166 receives light signals from the fiber 162 and produces an electric signal indicative of the interference pattern of the optical signals that combine in the coupler 164. A portion of the light in the fiber 156 couples into the fiber 162. Also a portion of the light in the fiber 162 couples and is transmitted toward an optical coupler 168. Therefore, the optical signal guided to the detector 168 is a superposition of portions of the signal guided by the fibers 156 and 162 to the coupler 164.

Light remaining in the optical fiber 152 after propagating past the coupler 160 propagates through a second sensing coil 170 and then to an optical coupler 172. The optical coupler 172 passes a portion of the light incident thereon straight through and couples the remainder of the incident light into an optical fiber 174. Light in the optical fiber 174 is guided to the optical coupler 168 and is partially coupled into the fiber 156. Part of the light in the optical fiber 156 incident upon the coupler 168 is coupled into the optical fiber 174. The optical signals incident upon the optical coupler 168 from the fibers 174 and 156 interfere in the optical coupler 168. The combined waves in the fiber 174 propagate from the optical coupler 168 to a detector 176. The second sensing coil 170 is also exposed to the field being measured, and changes in the field produce changes in the interference pattern in the optical signal incident upon the detector 176.

Light remaining in the fiber 152 propagates to a third sensing coil 178, an optical coupler 180, a fourth sensing coil 182, an optical coupler 184, a fifth sensing coil 186, an optical coupler 188, a sixth sensing coil 190,. an optical coupler 192, a seventh sensing coil 194 and an optical coupler 196. The optical couplers 180, 184, 188, 192 and 196 couple signals into optical fibers 198, 200, 202, 204 and 206, respectively. The optical signals in the optical fibers 198, 200, 202, 204 and 206 propagate to optical couplers 208, 210, 212, 214 and 216, respectively. The optical couplers 208, 210, 212, 214 and 216, combine the optical signals in the optical fibers 198, 200, 202, 204 and 206, respectively, with light in the fiber 156 to produce optical signals indicative of the field intensities to which the sensing coils 178, 182, 186, 190 and 194, respectively, are exposed. These optical signals then propagate to detectors 218, 220, 222, 224 and 226, which correspond to the fibers 198, 200, 202, 204 and 206, respectively.

Therefore, there are two paths by which light reaches each of the couplers 164, 164, 208, 210, 212, 214 and 216. Each pair of light paths in combination with the corresponding coupler 164, 164, 208, 210, 212, 214 or 216 comprise an interferometer. The lengths of the sensing coils 158, 170, 178, 182, 186, 190 and 194 are preferably adjusted to provide a binary sequence of sensitivities to the field being monitored. The sensitivity of a path-length mismatched interferometer is maximum when the two path lengths are adjusted to provide a null output when the sensing coil is not exposed to the field to be monitored. The details of the adjustment of the sensitivities and the resultant binary sequence are described in detail with reference to FIGS. 2 and 3. The embodiment of the invention shown in FIG. 11 requires fewer optical couplers than the embodiment shown in FIG. 2 to provide a digital word having a given number of bits.

Although the invention is described with reference to certain preferred embodiments, these embodiments are exemplary rather than limiting. The sensing systems are not limited to any particular number of interferometers or to any particular types of interferometers that may be used to practice the invention. Optical coupling devices, or beam splitters, other than those shown in the drawings and described herein may be used to form an optical sensing system according to the invention.

What is claimed is:

1. A sensor system, comprising:

a first optical interferometric sensor having a first sensitivity to a physical parameter, the output of the first sensor being cyclic with respect to changes in the physical parameter;

means for applying sufficient power to the first optical interferometric sensor to operate the first optical interferometric sensor over a predetermined dynamic range of the physical parameter;

a second optical interferometric sensor set to have a second sensitivity that is an integer multiple of the first sensitivity, the output of the second optical interferometric sensor being cyclic with respect to changes in the physical parameter such that a change in the parameter that produces $N_1$ cycles of the first optical interferometric sensor output produces $N_2$ cycles of the second optical interferometric sensor output, where $N_1$ and $N_2$ are integers; and means for applying sufficient power to the second optical interferometric sensor to operate the second optical interferometric sensor over a predetermined dynamic range of the physical parameter.

2. The sensor system of claim 1 wherein the first and second optical interferometric sensors each include a reference optical path isolated from the physical parameter being measured and a sensing optical path exposed to the physical parameter so that the signals output from each optical interferometric sensor are phase differences between light beams traversing the reference optical path and the sensing optical path.

3. The sensor system of claim 2 wherein the sensitivity of the first optical interferometric sensor is adjusted to produce a phase shift of $2\pi$ radians for a predetermined maximum field strength of the physical parameter and the sensitivity of the second optical interferometric sensor is adjusted to provide a $2\pi$ phase shift for a minimum detectable field strength of the physical parameter.

4. The sensor system of claim 3 comprising:
a first Mach-Zehnder interferometer having a first sensing arm and a first reference arm, the first reference arm having a first length; and
a second Mach-Zehnder interferometer having a second sensing arm and a second reference arm, the second reference arm having a second length, the first and second lengths being in the ratio of $N_1:N_2$.

5. The sensor system of claim 1, further including:
n optical interferometric sensors having sensitivities $N_1, N_2, N_3 \ldots N_n$ in the ratios of $1:2:4: \ldots 2^{n-1}$ to form a binary sequence; and
detector means for monitoring the output of each optical interferometric sensor, the detector means producing a logic high signal corresponding to each optical interferometric sensor having an output exceeding a threshold value and producing a logic low signal corresponding to each optical interferometric sensor having an output below the threshold value.

6. The sensor system of claim 5 wherein each of the plurality of optical interferometric sensors comprises a Mach-Zehnder interferometer having a sensing arm and a reference arm, the reference arms of the Mach-Zehnder interferometers being adjusted to form sensitivities in the ratio of the the binary sequence.

7. The sensor of claim 5 wherein the optical interferometric sensors are arranged in an increasing progression of sensitivity beginning with the least sensitive and end with the most sensitive to form a digital word.

8. The sensor of claim 7 wherein the optical interferometric sensors are responsive to acoustic pressure changes and the digital word is indicative of acoustic pressure changes.

9. A method for forming a sensor system, comprising the steps of:
constructing a first sensor having a first sensitivity to a physical parameter such that the output of the first sensor is cyclic with respect to changes in the physical parameter;
applying sufficient power to the first sensor to operate the first sensor over a predetermined dynamic range of the physical parameter
constructing a second sensor having a second sensitivity that is an integer multiple of the first sensitivity such that the output of the second sensor is cyclic with respect to changes in the physical parameter such that a change in the parameter that produces $N_1$ cycles of the first sensor output produces $N_2$ cycles of the second sensor output, where $N_1$ and $N_2$ are integers; and
applying sufficient power to the second sensor to operate the second sensor over a predetermined dynamic range of the physical parameter.

10. The method of claim 9 further including the steps of forming the first and second sensors as interferometric optical sensors such that each includes a reference optical path isolated from the physical parameter being measured and a sensing optical path exposed to the physical parameter so that the signals output from each sensor are phase differences between light beams traversing the reference optical path and the sensing optical path.

11. The method of claim 10 wherein the sensitivity of the first sensor is adjusted to produce a phase shift of $2\pi$ radians for a predetermined maximum field strength of the physical parameter and the sensitivity of the second sensor is adjusted to provide a $2\pi$ phase shift for a minimum detectable field strength of the physical parameter.

12. The method of claim 11 comprising:
forming the first sensor to comprise a first Mach-Zehnder interferometer having a first sensing arm and a first reference arm, the first reference arm having a first length; and
forming the second sensor to comprise a second Mach-Zehnder interferometer having a second sensing arm and a second reference arm, the second reference arm having a second length, the first and second lengths being in the ratio of $N_1:N_2$.

13. The method of claim 10, further including:
providing a plurality of sensors having sensitivities $N_1, N_2, N_3 \ldots N_n$ in the ratios of $1:2:4: \ldots 2^{n-1}$ to form a binary sequence; and
monitoring the output of each sensor, the detector means producing a logic high signal corresponding to each sensor having an output exceeding a threshold value and producing a logic low signal corresponding to each sensor having an output below the threshold value.

14. The method of claim 12, further including the steps of forming each of the plurality of sensors to comprise a Mach-Zehnder interferometer having a sensing arm and a reference arm, the reference arms of the Mach-Zehnder interferometers being adjusted to form sensitivities in the ratio of the binary sequence.

15. The method of claim 12 further including the step of arranging the sensors in an increasing progression of sensitivity beginning with the least sensitive and ending with the most sensitive to form a digital word.

16. The method of claim 15 wherein the sensors are responsive to acoustic pressure changes and the digital word is indicative of acoustic pressure changes.

17. A sensing system, comprising:
a first optical fiber;
means for introducing an optical signal into the first optical fiber;
a second optical fiber;
first optical coupling means for coupling a portion of the optical signal from the first optical fiber into the second optical fiber;
a third optical fiber;
second optical coupler means for coupling light from the first optical fiber into the third optical fiber;
third optical coupler means for coupling light between the first and third optical fibers, the second and third optical coupler means being positioned such that a reference length of the first optical fiber is between the second and third optical coupler means and a sensing length of the third optical fiber is between the second and third optical coupler means, the sensing length being arranged for exposure to a physical parameter being measured;
detector means for monitoring interference between light coupled between the first and third optical fibers;
a fourth optical fiber;
fourth optical coupler means for coupling light from the second optical fiber into the fourth optical fiber;

fifth optical coupler means for coupling light between the second and fourth optical fibers, the fourth and fifth optical coupler means being positioned such that a reference length of the second optical fiber is between the fourth and fifth optical coupler means and a sensing length of the fourth optical fiber is between the fourth and fifth optical coupler means, the sensing length being arranged for exposure to a physical parameter being measured, the sensitivities of the sensing lengths of the third and fourth optical fibers being in a predetermined ratio such that a predetermined maximum field strength of the physical parameter produces a $2\pi$ phase shift in optical signals guided by the first and third fibers and a produces a phase shift of $2\pi N$ in the optical signal guided by the second and fourth optical fibers, where N is an integer, and predetermined minimum field strength of the physical parameter produces a $2\pi$ phase shift in the optical signal guided by the second and fourth optical fibers; and detector means for monitoring interference between light coupled between the second and fourth optical fibers.

18. The sensor system of claim 17 wherein N is 1000 such that the sensor system has a dynamic range of $10^6$.

19. A sensor system, comprising:

a first optical fiber;

first optical coupler means for coupling light from the first optical fiber into each of a plurality of sensing optical fibers;

second optical coupler means for coupling light from each of the sensing fibers into a corresponding plurality of reference optical fibers;

third optical coupler means for coupling light between pairs of the reference and sensing fibers such that the sensing and reference fibers form a plurality of interferometric sensors, the sensing fibers being adjusted to have sensitivities that form a predetermined sequence; and detector means for monitoring interference patterns produced by combining the optical signals in the corresponding pairs of sensing and reference optical fibers.

20. The sensing system of claim 19 wherein the sensing fibers are adjusted to form a binary sequence.

21. The sensing system of claim 20 wherein the sensing fibers are arranged in an increasing progression of sensitivity beginning with the least expensive and ending with the most sensitive to form a digital word.

22. The sensor of claim 21 wherein the sensors are responsive to acoustic pressure changes, and the digital word is indicative of acoustic pressure changes.

* * * * *